(12) United States Patent
Weng et al.

(10) Patent No.: US 10,347,149 B2
(45) Date of Patent: Jul. 9, 2019

(54) SLINGSHOT SIMULATOR

(71) Applicant: Brogent Technologies Inc., Kaohsiung (TW)

(72) Inventors: Dah-Cheng Weng, Kaohsiung (TW); Cheng Tao Wu, Kaohsiung (TW); Pei-Fang Ke, Kaohsiung (TW); An Kiang, Kaohsiung (TW)

(73) Assignee: BROGENT TECHNOLOGIES INC., Kaohsiung (TW)

( * ) Notice: Subject to any disclaimer, the term of this patent is extended or adjusted under 35 U.S.C. 154(b) by 155 days.

(21) Appl. No.: 15/452,557

(22) Filed: Mar. 7, 2017

(65) Prior Publication Data
US 2018/0261119 A1    Sep. 13, 2018

(51) Int. Cl.
*G09B 9/00*    (2006.01)
*F41B 3/02*    (2006.01)
*F41B 5/14*    (2006.01)

(52) U.S. Cl.
CPC .............. *G09B 9/00* (2013.01); *F41B 3/02* (2013.01); *F41B 5/1476* (2013.01)

(58) Field of Classification Search
None
See application file for complete search history.

(56) References Cited

U.S. PATENT DOCUMENTS

2010/0170494 A1    7/2010  Saunders
2013/0303247 A1*  11/2013  Wu ...................... A63F 13/005
                                          463/5

FOREIGN PATENT DOCUMENTS

| CN | 2703563 Y | 6/2005 |
|---|---|---|
| CN | 102580312 A | 7/2012 |
| CN | 103357173 A | 10/2013 |
| CN | 103791770 A | 5/2014 |
| CN | 106362390 A | 2/2017 |
| CN | 205924940 U | 2/2017 |
| TW | 201221191 A | 6/2012 |

OTHER PUBLICATIONS

Office Action dated Apr. 26, 2019 of the corresponding China patent application No. 201710081546.8.

* cited by examiner

*Primary Examiner* — James B Hull
(74) *Attorney, Agent, or Firm* — Chung-Ming Shih; HDLS IPR Services

(57) ABSTRACT

A slingshot simulator includes a housing, a trigger mechanism and an elastic band. A window is defined on the housing, a switch is arranged at one side of the window, and a connector electrically connected to the switch is disposed in the housing. The trigger mechanism is arranged on a side outer surface of the housing and at one side of the window corresponding to the switch. The trigger mechanism is able to move relative to the switch to alter an electrical status of the switch. The elastic band is connected to the trigger mechanism and able to actuate the trigger mechanism to move relative to the switch. The electrical status of the switch is altered while a user pulls the elastic band to simulate a bow-shooting operation, and a corresponding signal is delivered via the connector.

4 Claims, 6 Drawing Sheets

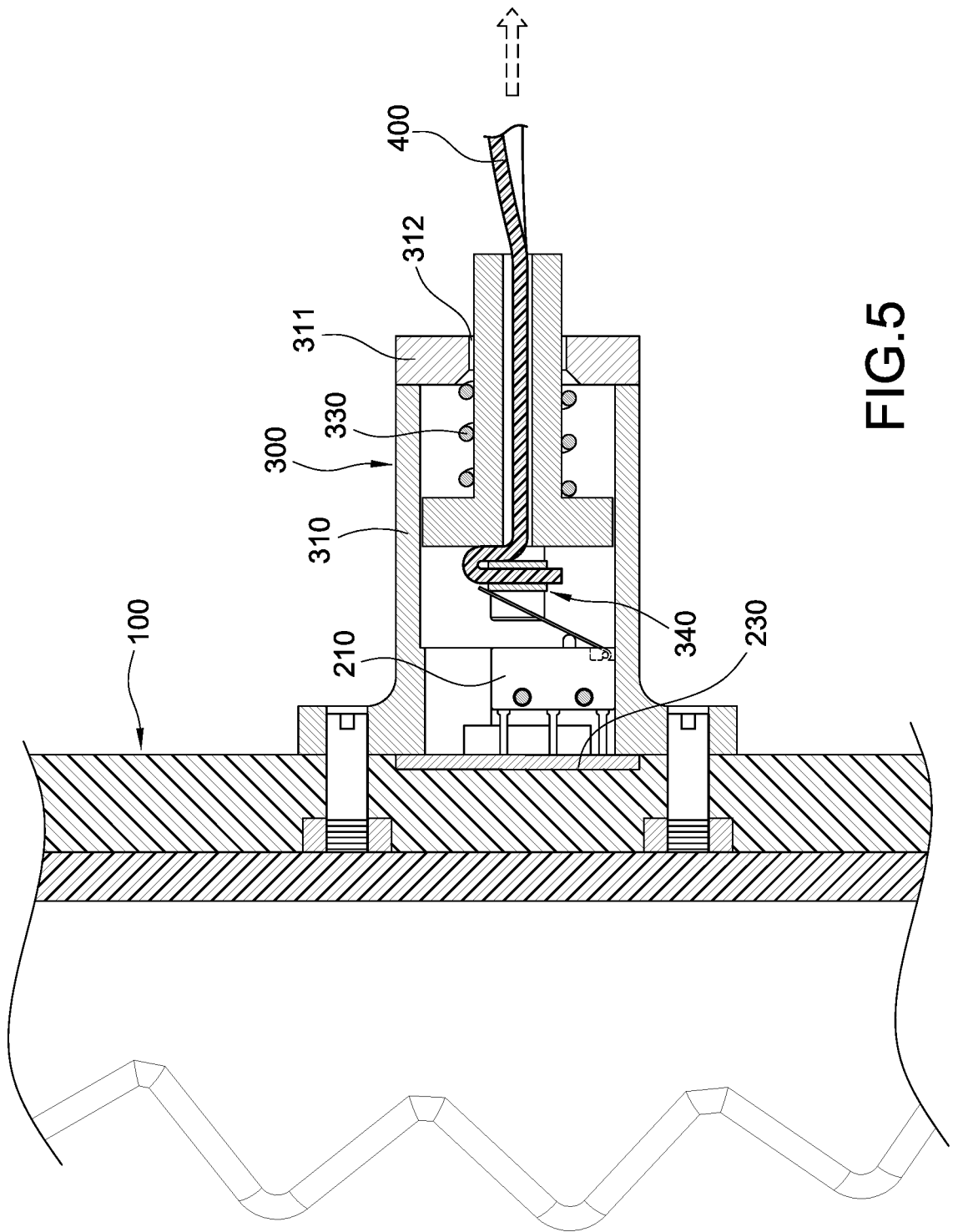

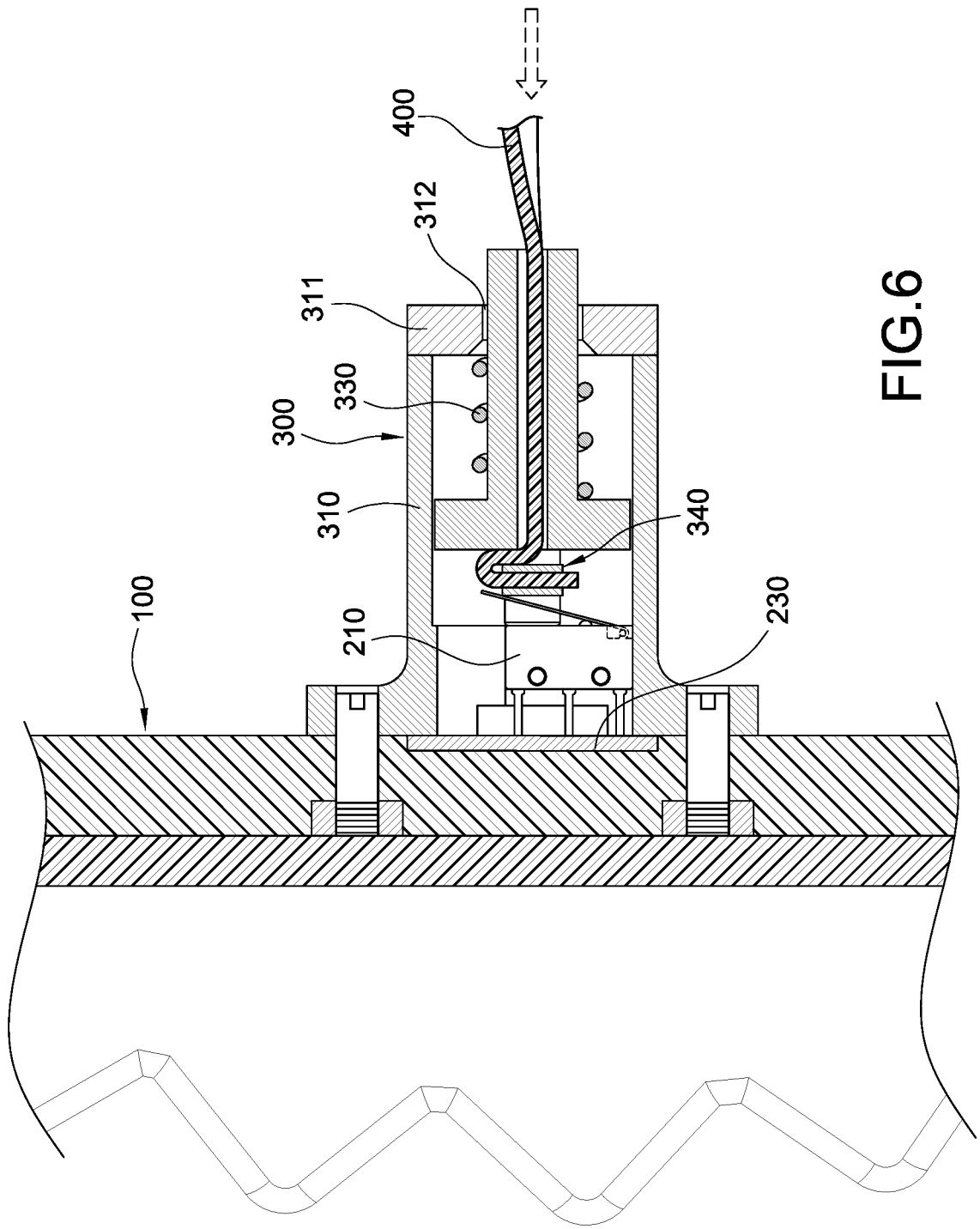

SLINGSHOT SIMULATOR

BACKGROUND OF THE INVENTION

Field of the Invention

The present invention relates to a virtual reality simulator, especially to a slingshot simulator.

Description of Related Art

A conventional virtual reality technology for motions is able to combine the motions of an object or a human body with an artificial virtual environment, so that a user can experience the virtual activity via a simulator. Generally, various sensors are adopted for sensing data such as the locations and the accelerated velocities of a human body or an object, the data is sent to an electric device, so that the data can be calculated by the electric device for displaying a corresponding virtual environment. The above-mentioned virtual reality technology can be integrated with a mobile electric device, but a wireless network is required for connection and integration, and the arrangement of sensors is very complicated, moreover, a situation of poor synchronization may happen because massive date is transmitted by the wireless network and the electric device has to process the massive data at the same time.

Accordingly, the applicant of the present invention has devoted himself for improving the mentioned disadvantages.

SUMMARY OF THE INVENTION

The present invention is to provide a slingshot simulator for simulating a slingshot shooting operation.

Accordingly, the present invention provides a slingshot simulator including a housing, a trigger mechanism and an elastic band. A window is defined on the housing, a switch is arranged at one side of the window, and a connector electrically connected to the switch is disposed in the housing. The trigger mechanism is arranged on a side outer surface of the housing and at one side of the window corresponding to the switch. The trigger mechanism is able to move relative to the switch to alter an electrical status of the switch. The elastic band is connected to the trigger mechanism and able to actuate the trigger mechanism to move relative to the switch.

According to the slingshot simulator provided by the present invention, a first end of the elastic band is connected to the trigger mechanism. The trigger mechanism includes a sleeve, a piston and a spring, the sleeve is arranged on a side outer surface of the housing, the piston is disposed in the sleeve, and the spring is abutted against the sleeve and the piston for pushing the piston towards the switch. A clipper is disposed at one end of the piston; the first end of the elastic band is received in the sleeve and clipped by the clipper for driving the piston to be away from the switch. An axial hole is formed in the piston, and the first end of the elastic band is received in the axial hole. The elastic band is arranged to cross the window and a second end of the elastic band is fastened at another side of the window.

According to the slingshot simulator provided by the present invention, an electric device is disposed in the housing, and the connector is electrically connected to the electric device. The electric device has a display unit, and the display unit is exposed in the window. A circuit board is mounted in the housing, and the circuit board is electrically connected to the switch and the connector. The elastic band and the window are spaced with an interval.

According to the slingshot simulator provided by the present invention, a user can pull the elastic band to simulate a bow-shooting operation, and the elastic band is able to actuate the trigger mechanism to alter the electrical status of the switch for enabling the electric device connected to the connector to generate a corresponding simulated image.

BRIEF DESCRIPTION OF DRAWING

FIG. 5 is a cross sectional view showing an operating status of the trigger mechanism of the slingshot simulator of FIG. 3 taken along a 5-5 line; and FIG. 6 is a cross sectional view showing another operating status of the trigger mechanism of the slingshot simulator of FIG. 3 taken along the 5-5 line.

DETAILED DESCRIPTION OF THE INVENTION

One preferred embodiment of the present invention will be described with reference to the drawings.

Figure 1:
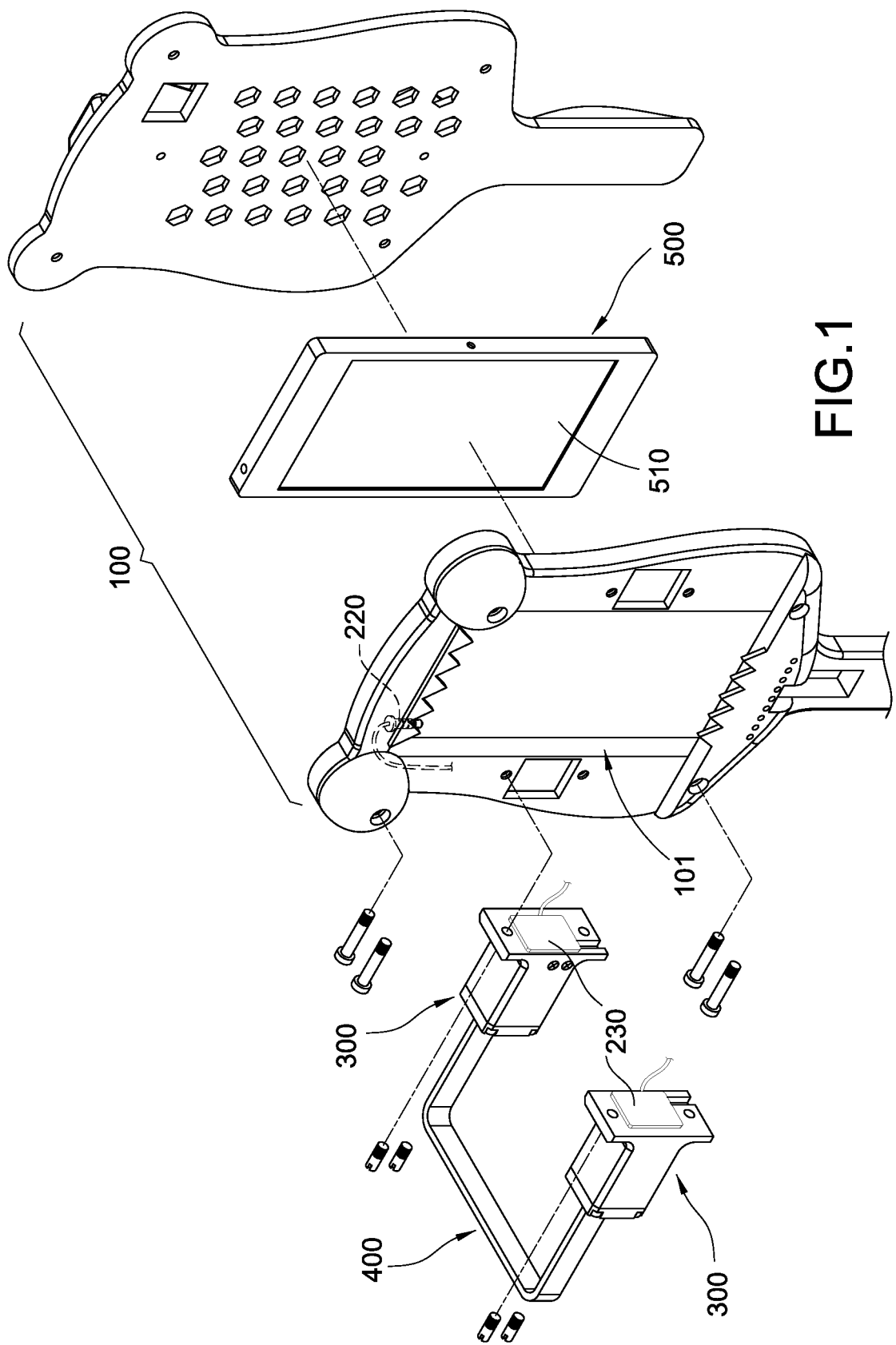
FIG. 1 is a perspective exploded view showing a slingshot simulator according to one preferred embodiment of the present invention.
Figure 2:
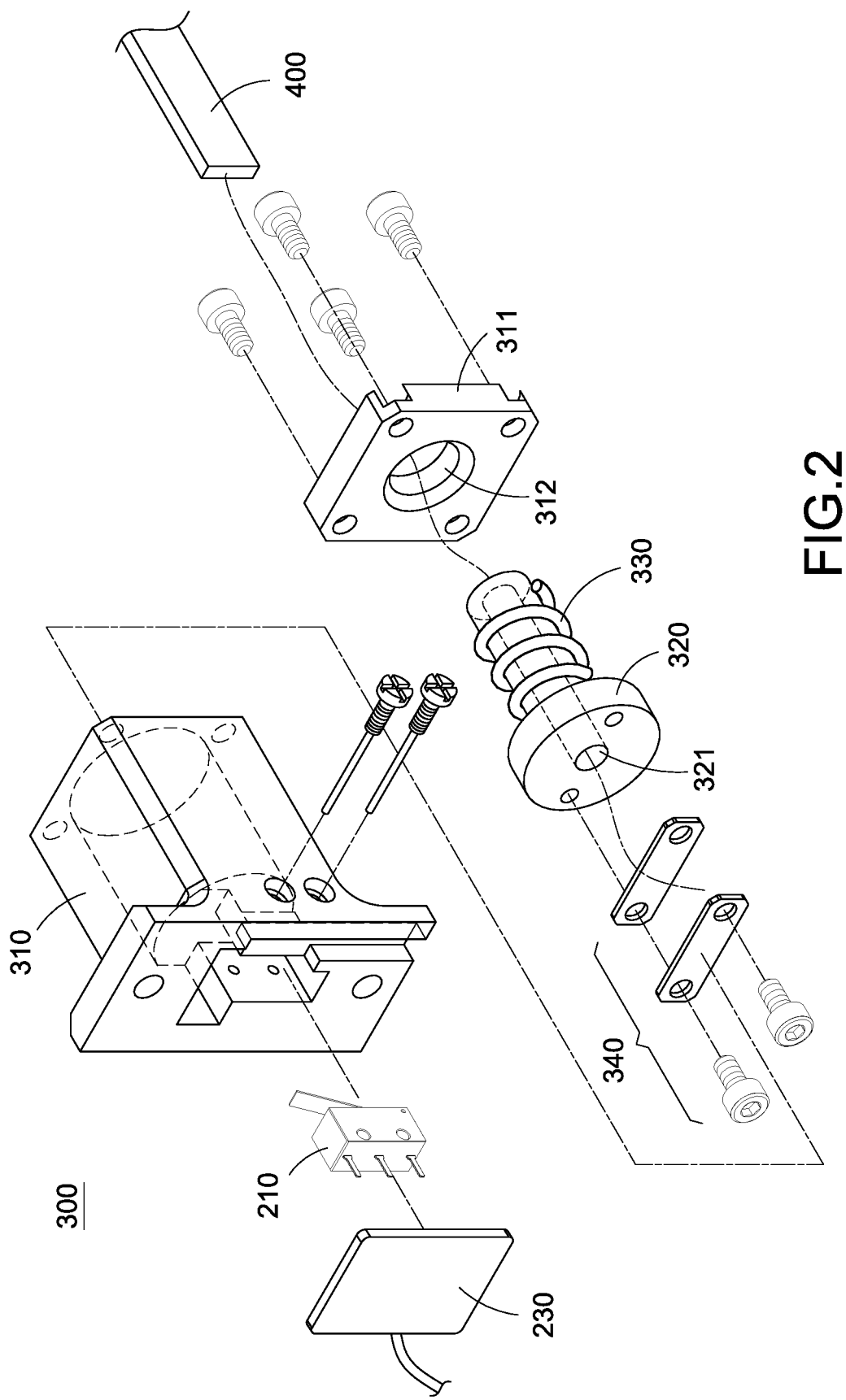
FIG. 2 is a perspective exploded view showing a trigger mechanism of the slingshot simulator according to one preferred embodiment of the present invention.
Figure 3:
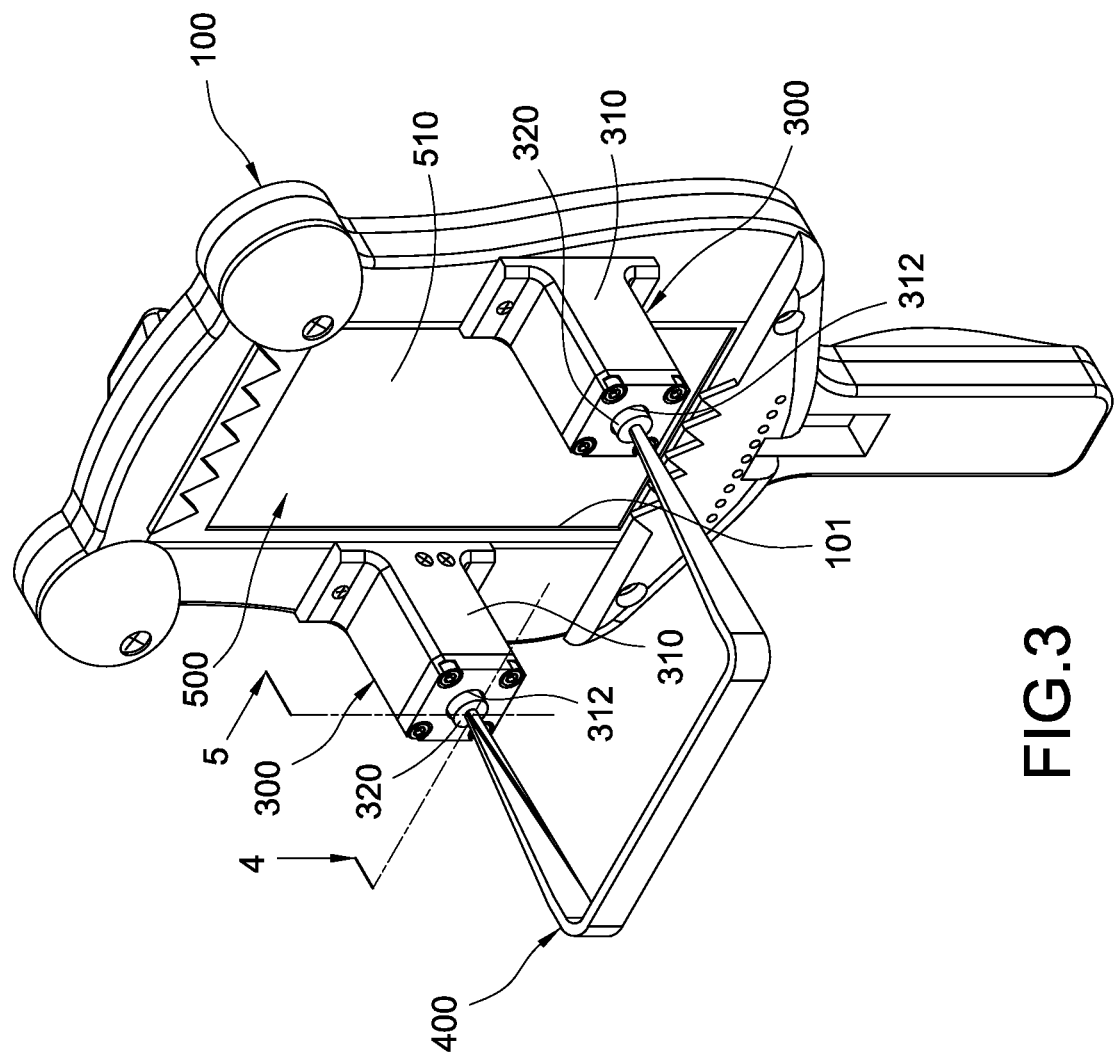
FIG. 3 is a perspective view showing the slingshot simulator according to one preferred embodiment of the present invention.
Figure 4:
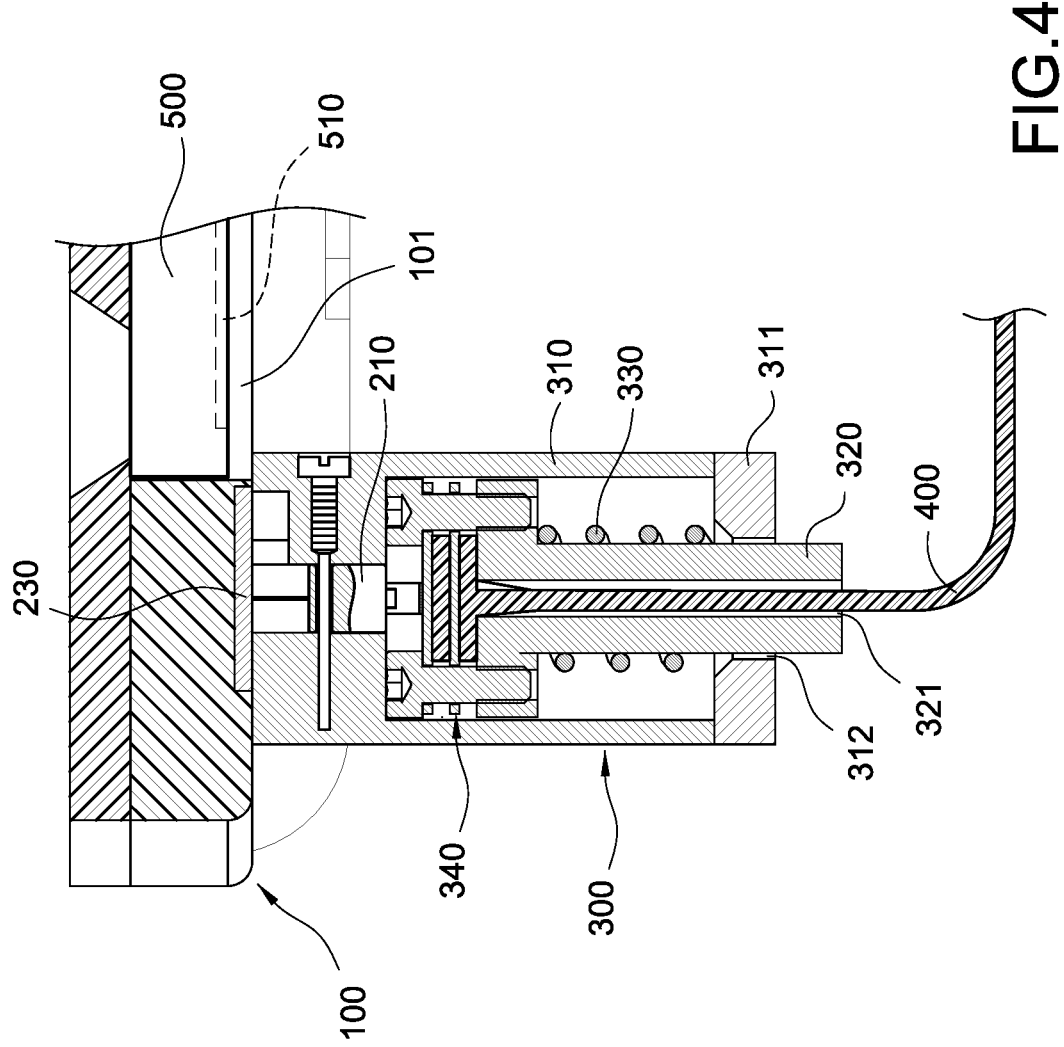
FIG. 4 is a cross sectional view of the slingshot simulator of FIG. 3 taken along a 4-4 line.

Please refer from FIG. 1 to FIG. 4, a slingshot simulator including a housing 100, at least one trigger mechanism 300, an elastic band 400 and an electric device 500 is disclosed according to one preferred embodiment of the present invention.

A rectangular window 101 is defined on the housing 100, a switch 210 is arranged at one side of the window 101, according to this embodiment, there are preferably a pair of the same switches 210 arranged at two sides of the window 101, but what shall be addressed is that the scope of the present invention is not limited to the above-mentioned arrangement. A connector 220 is disposed in the housing 100, according to the present invention, the connector 220 is preferably to be an audio source connector 220, the connector 220 is mounted in the housing 100 and protruded towards the interior of the housing 100, and the connector 220 is preferably to be electrically connected to the switch 210 via electric wires embedded in the housing 100. A circuit board 230 is preferably disposed on the housing 100 corresponding to the switch 210, the circuit board 230 is electrically connected to the corresponding switch 210 and the connector 220, so that the connector 220 is able to deliver a signal (for example ON/OFF or different voltage values) corresponding to an electrical status of the switch 210 via the connector 220 being electrically connected to the switch 210.

Please refer from FIG. 3 to FIG. 6, according to this embodiment, the above-mentioned trigger mechanism 300 is disposed corresponding to the switch 210, the trigger mechanism 300 is arranged on a side outer surface of the housing 100 and the trigger mechanisms 300 are oppositely arranged at two sides of the window 101. The trigger mechanism 300 is able to move relative to the switch 210 to alter an electrical status of the switch 210 (for example ON/OFF or altering a loaded voltage value). According to this embodiment, the trigger mechanisms 300 have the same structure, and the trigger mechanism 300 preferably includes a sleeve 310, a piston 320 and a spring 330. Two ends of the sleeve 310 are formed in an opened status, one end of the sleeve 310 is disposed with an end cover 311, and a penetrated hole 312 is formed on the end cover 311. Another end of the sleeve 310 is connected to the housing 100 for enabling the sleeve 310 to be arranged on a side outer surface of the housing 100, and the corresponding switch 210 is fastened at this end. The piston 320 is disposed in the sleeve 310 and able to axially slide along the sleeve 310. The spring 330 is disposed in the piston 320 and two ends of the spring 330 are abutted against the end cover 311 of the sleeve 310 and the piston 320 (at the end facing the switch 210), so that the piston 320 is able to be pushed towards the corresponding switch 210 in the sleeve 310. Preferably, an axial hole 321 is formed in the piston 320, and a clipper 340 is disposed at one end of the piston 320 facing the switch 210, another end of the piston 320 is received in the penetrated hole 312 and capable of moving in the penetrated hole 312, so that two ends of the piston 320 are restrained by an inner wall of the sleeve 310 and the penetrated hole 312 for allowing the piston 320 to axially slide along the sleeve 310.

Two ends of the elastic band 400 are connected to the trigger mechanisms 300 and respectively disposed at two sides of the window 101, so that the elastic band 400 is arranged to cross the window 101, two ends of the trigger mechanism 300 are connected to the housing 100 and the elastic band 400 for allowing the elastic band 400 and the window 101 to be spaced with an interval. Accordingly, the elastic band 400 is able to actuate the trigger mechanism 300 to move relative to the corresponding switch 210. Each end of the elastic band 400 is received in the corresponding sleeve 310, and is preferably to pass the axial hole 321 of the piston 320 and clipped by the clipper 340, so that the piston 320 is able to be moved away from the switch 210 by pulling the elastic band 400.

The electric device 500 is disposed in the housing 100 and has a display unit 510, the electric device 500 can be a mobile phone or a tablet computer, but what shall be addressed is that the scope of the present invention is not limited to the above-mentioned arrangement. The connector 220 is inserted in the electric device 500 so as to be electrically connected to the electric device 500, and the display unit 510 of the electric device 500 is exposed in the window 101 of the housing 100. Because the elastic band 400 and the window 101 are spaced with the interval, when the elastic band 400 is operated, the elastic band 400 is prevented from colliding with the display unit 510.

With the slingshot simulator provided by the present invention, a user can pull the elastic band 400 to simulate a bow-shooting operation, and the elastic band 400 is able to actuate the trigger mechanism 300 to alter the electrical status of the switch 210 for enabling the electric device 500 connected to the connector 220 to generate a corresponding simulated image. As such, the present invention can utilize mechanical components for converting the bow-shooting operation into a simple signal which is delivered to the electric device 500 via an audio source wire, and a gyroscope built in the electric device 500 is served to allow the operation of shooting simulation to be achieved, thereby proving a stable performance.

Although the present invention has been described with reference to the foregoing preferred embodiment, it will be understood that the invention is not limited to the details thereof. Various equivalent variations and modifications can still occur to those skilled in this art in view of the teachings of the present invention. Thus, all such variations and equivalent modifications are also embraced within the scope of the invention as defined in the appended claims.

What is claimed is:

1. A slingshot simulator, including:
   a housing, defined with a window, wherein a switch is arranged at one side of the window, and a connector electrically connected to the switch is disposed in the housing;
   a trigger mechanism, arranged on a side outer surface of the housing and at one side of the window corresponding to the switch, wherein the trigger mechanism is able to move relative to the switch to alter an electrical status of the switch;
   an elastic band, a first end of the elastic band being connected to the trigger mechanism and being able to actuate the trigger mechanism to move relative to the switch;
   wherein the trigger mechanism includes a sleeve, a piston and a spring, the sleeve is arranged on the side outer surface of the housing, the piston is disposed in the sleeve, and the spring is abutted against the sleeve and the piston for pushing the piston towards the switch;
   wherein the elastic band is arranged to cross the window and a second end of the elastic band is fastened at another side of the window;
   wherein an electric device comprising a mobile phone or a tablet computer is disposed in the housing, and the connector is electrically connected to the electric device;
   wherein the electric device has a display unit, and the display unit is exposed in the window;
   wherein a circuit board is mounted in the housing, and the circuit board is electrically connected to the switch and the connector so that the connector is able to deliver a signal corresponding to the electrical status of the switch via the connector which enables the electric device connected to the connector to generate a corresponding simulated image.

2. The slingshot simulator according to claim 1, wherein a clip is disposed at one end of the piston, the first end of the elastic band is received in the sleeve and clipped by the clip for driving the piston to be away from the switch.

3. The slingshot simulator according to claim 2, wherein an axial hole is formed in the piston, and the first end of the elastic band is received in the axial hole.

4. The slingshot simulator according to claim 1, wherein the elastic band and the window are spaced with an interval.

* * * * *